United States Patent [19]

Shimizu

[11] Patent Number: 4,898,441
[45] Date of Patent: Feb. 6, 1990

[54] POLARIZATION CONTROLLER

[75] Inventor: Haruhito Shimizu, Tokyo, Japan

[73] Assignee: NEC Corporation, Tokyo, Japan

[21] Appl. No.: 188,870

[22] Filed: May 2, 1988

[30] Foreign Application Priority Data

May 1, 1987 [JP] Japan .................................. 62-106264
May 29, 1987 [JP] Japan .................................. 62-137268

[51] Int. Cl.⁴ .............................................. G02B 6/10
[52] U.S. Cl. .............................. 350/96.14; 350/96.13; 350/392
[58] Field of Search ............... 350/96.11, 96.12, 96.13, 350/96.14, 370, 374, 384, 385, 386, 389, 390, 392, 400, 406, 407

[56] References Cited

U.S. PATENT DOCUMENTS

| | | | |
|---|---|---|---|
| 3,877,781 | 4/1975 | Kaminow | 350/96.14 |
| 4,262,994 | 4/1981 | Sheem | 350/96.14 |
| 4,533,207 | 8/1985 | Alferness | 350/96.14 |
| 4,691,984 | 9/1987 | Thaniyavarn | 350/96.14 |
| 4,775,208 | 10/1988 | Robinson et al. | 350/96.14 |

OTHER PUBLICATIONS

"Optical Waveguide Polarization Controller in Z-Propagation LiNbO₃", National Conference Record, 1986, Optical and Radio Wave Electronics, the Institute of Electronics and Communication Engineers of Japan.

*Primary Examiner*—Frank Gonzalez
*Attorney, Agent, or Firm*—Sughrue, Mion, Zinn, Macpeak & Seas

[57] ABSTRACT

A polarization controller comprises a plurality of devices connected in series to each other. Each device includes an optical channel waveguide which is common to the plurality of devices, and an electrode positioned on the optical channel waveguide and two electrodes positioned on both sides of the optical channel waveguide. A retardation induced by electrooptic effect in each device is adjusted by voltages applied to the electrode and the two electrodes. The voltages are not kept increasing or decreasing, but changed periodically so that there is no limitation in an operating range for controlling a polarization of light which is propagated through the optical channel waveguide.

3 Claims, 3 Drawing Sheets

POLARIZATION CONTROLLER

FIELD OF THE INVENTION

The invention relates to a polarization controller, and more particularly to a waveguide type of a polarization controller which is applied to an optical communication system, an optical fiber sensor and so on.

BACKGROUND OF THE INVENTION

It is required that a polarization controller for converting an arbitrary polarization to a constant linear polarization or another arbitrary polarization is provided in an optical system such as an optical communication system, an optical fiber sensor and so on. Among polarization controllers, a waveguide type of a polarization controller is advantageous in that it is light weight, has a high productivity, and can be integrated with other devices easily so that the polarization controller is expected to be widely put into practical use.

A waveguide type of a conventional polarization controller has been described in a report entitled "Optical waveguide polarization controller in Z-propagation LiNbO3" which was published as "NATIONAL CONFERENCE RECORD, 1986, OPTICAL AND RADIO WAVE ELECTRONICS, THE INSTITUTE OF ELECTRONICS AND COMMUNICATION ENGINEERS OF JAPAN". The conventional polarization controller is of a tandem structure which is composed of a phase shifter and a mode converter, and comprises an optical channel waveguide (simply called "a waveguide" hereinafter) extended along Z-axis on a LiNbO3 substrate, first and second electrodes provided on both sides of the waveguide in a region of the phase shifter of the substrate, and first to third electrodes provided on the waveguide and both sides thereof in a region of the mode converter.

In the phase shifter, the first electrode is connected to ground, and an adjustable voltage V1 is applied to the second electrode. In the mode converter, the first electrode is connected on the ground side of the waveguide, an adjustable voltage V2 is applied on the waveguide to the second electrode, and a constant voltage V3 is applied on the other side of the waveguide to the third electrode. As a result, birefringence is changed in a direction orthogonal to the light propagation direction of the waveguide and parallel to the surface of the substrate in the region of the phase shifter. In the region of the mode converter, on the other hand, the birefringence of the waveguide is compensated to result in an isotropic condition in accordance with the applied voltage V3, and an extent of a birefringence is changed in a direction orthogonal to the light propagation direction of the waveguide and in a direction of 45 degrees in regard to the surface of the substrate. If it is assumed that a phase difference between TE and TM modes is $\pi/2$ just in front of the mode converter by adjusting the voltage V1 in the phase shifter, an input light of an arbitrary polarization which is incident to the polarization controller is converted to an output light of a linear polarization which is supplied therefrom to a next stage when an amplitude ratio of the TE and TM modes is controlled to be an appropriate ratio by adjusting the voltage V2 in the mode converter.

In addition to the polarization controller described above, another polarization controller has been proposed in U.S. Pat. No. 4,691,984 which was issued on Sept. 8, 1987. The latter polarization controller comprises a further phase shifter which is the same structure as that of the phase shifter in the former polarization controller. In other words, the latter polarization controller comprises a first and second phase shifters and a mode converter which is positioned between the first and second phase shifters wherein the mode converter is also the same structure as that of the mode converter in the former polarization controller.

In operation, the same adjustments of voltages are performed in the first and second phase shifters and the mode converter as in the former polarization controller described above so that an input light of an arbitrary polarization which is incident to the polarization controller is converted to an output light of another arbitrary polarization which is supplied therefrom to a next stage.

According to the conventional polarization controller as formerly described, however, there is a disadvantage that the aforementioned voltage V1 must be kept increasing or decreasing to convert a phase difference of TE and TM modes of an input light, which is incident to the phase shifter, to $\pi/2$ successively in a case where the phase difference continues to be increased or decreased. In this regard, it is not allowed to increase or decrease the voltage V1 which is applied to the second electrodes to an unlimited extent because the strength of the insulation of the second electrode is limited. This results in the impossibility of controlling an arbitrary polarization in the phase shifter. That is, this means that there is a limitation for the operating range in controlling a fluctuation of a polarization in an input light which is incident to the phase shifter.

Even in the polarization controller as proposed in the aforementioned U.S. Pat. No. 4,691,984, the same disadvantage is observed.

SUMMARY OF THE INVENTION

Accordingly, it is an object of the invention to provide a polarization controller in which there is no limitation in an operating range for the control of an input light polarization.

It is a further object of the invention to provide a polarization controller in which any fluctuation of an input light polarization can be controlled.

According to the invention, a polarization controller comprises,
   an optical channel waveguide provided on a substrate having an electrooptic effect, and
   a plural groups of electrodes provided in series along said optical channel waveguide, each of said plural groups of said electrodes including an electrode positioned on said optical channel waveguide and two electrodes positioned on both sides thereof, and predetermined voltages being applied to said electrode and said two electrodes,
   wherein a birefringence of said optical channel waveguide is produced therein in a predetermined direction on a plane orthogonal to the light propagating direction to a predetermined extent by said each of said plural groups of said electrodes.

BRIEF DESCRIPTION OF THE DRAWINGS

The invention will be explained in more detail in conjunction with following drawings wherein.

DESCRIPTION OF PREFERRED EMBODIMENTS

Figure 1:
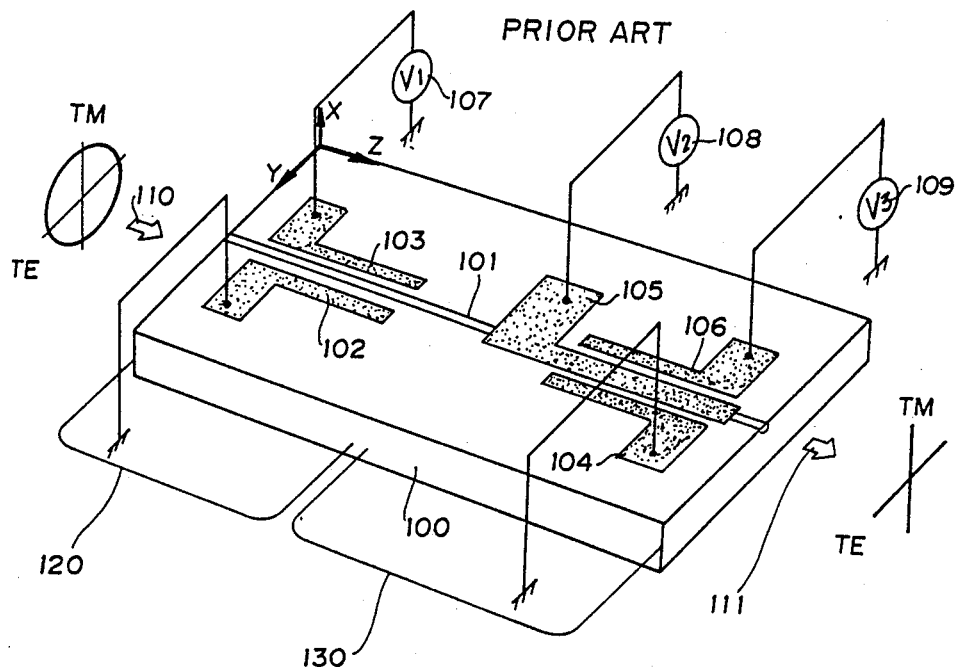
FIG. 1 is a perspective view showing a conventional polarization controller.

Before explaining a polarization controller in a first embodiment according to the invention, the conventional polarization controller which has been described in the aforementioned report of "THE INSTITUTE OF ELECTRONICS AND COMMUNICATION ENGINEERS OF JAPAN" will be explained again. FIG. 1 shows the conventional polarization controller which is composed of a phase shifter 120 and a mode converter 130. The phase shifter 120 comprises a waveguide 101 provided on a LiNbO3 substrate 100, a first electrode 102 provided on one side of the waveguide 101 and connected to ground, and a second electrode 103 provided on the other side of the waveguide 101 and connected to a power source 107 from which an adjustable voltage V1 is applied thereto. The mode converter 130 comprises the waveguide 101 provided on the LiNbO3, substrate 100, a first electrode 104 provided on one side of the waveguide 101 and connected to ground, a second electrode 105 provided on the waveguide 101 and connected to a power source 108 from which an adjustable voltage 108 is applied thereto, and a third electrode 109 provided on the other side of the waveguide 101 and connected to a power source 109 from which a constant voltage V3 is applied thereto.

In operation, when an input light 110 of an elliptical polarization is incident to the waveguide 101 of the phase shifter 120, an output light 111 of a linear polarization is supplied from the waveguide 101 of the mode converter 130 to a next stage. The operation of the conventional polarization controller is explained before so that repeated explanations are omitted here.

Figure 2:
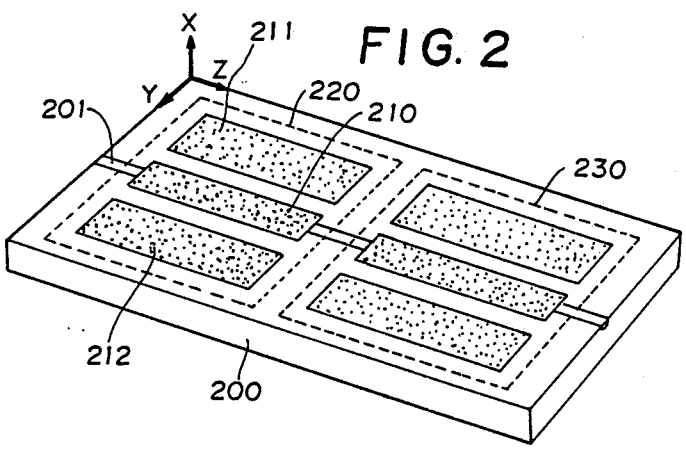
FIG. 2 is a perspective view showing a polarization controller in a first embodiment according to the invention.

In FIG. 2, there is shown a polarization controller in the first embodiment according to the invention. The polarization controller comprises a waveguide 201 provided on a substrate 200 of LiNbO3 to extend in a direction of Z axis, and three electrodes 210, 211 and 212 of aluminum provided on the waveguide 201 and on both sides thereof whereby a first device 220 is formed on the substrate 200. The polarization controller further comprises a second device 230 which is connected in series to the first device 220 and is of the same structure as that of the first device 220. The waveguide 201 is formed by indiffusion of a 8μm wide, 1000Å thick titanium stripe at 1025° C. for 6 hours into the substrate 200, and is of a single mode excitation for both TE and TM modes. Lengths of the electrodes 210, 211 and 212 are 10 mm respectively, a width of the electrode 210 is 8 μm and widths of the electrodes 211 and 212 are 15 μm respectively. There are provided gaps of 4 μm on the substrate 200 respectively between the electrodes 210 and 211 and between the electrodes 210 and 212, and a SiO2 buffer layer (not shown) having a thickness of 3000Å by the CVD process between the waveguide 201 and the electrode 210. The buffer layer prevents light propagating through the waveguide 201 from being attenuated.

In operation, when predetermined voltages which are described later are applied to the electrodes 210 and 211 in the first device 220, the first device 220 operates as a quarter-wave plate so that a retardation induced by electrooptic effect in the first device 220 is $\pi/2$, and a principal axis of a birefringence induced in the waveguide 201 is rotated in an arbitrary direction by adjusting the voltages applied to the electrodes 210 and 211. At the present stage, it is not required to keep increasing or decreasing the voltages which are applied to the electrodes 210 and 11 to rotate the principal axis because the voltages are changed periodically. On the other hand, the second device 230 is operated as a half-wave plate in which voltages applied to electrodes corresponding to the electrodes 210 and 211 to rotate a principal axis of a birefringence are changed periodically in the same manner as in the first device 220. For this reason, it is not also required to keep increasing or decreasing the voltages applied to the corresponding electrodes. Therefore, when the direction of the principal axis of birefringence induced in the waveguide 201 are adjusted in the first and second devices 220 and 230, an input light of an arbitrary polarization which is incident to the waveguide 201 of the first device 220 is converted to an output light of an arbitrary linear polarization to be supplied from the second device 230 to a next stage. In more detail, the input light of an arbitrary polarization is converted in the first device 220 to a light of a linear polarization which is then converted in the second device 230 to the output light of an arbitrary linear polarization.

According to the polarization controller in the first embodiment, there is no limitation in an operating range in which a polarization of an input light is controlled because any voltage applied to the electrodes 210 and 211 of the first device 220 and to the corresponding electrodes of the second device 30 does not exceed a specified voltage. Although the first and second devices 220 and 230 are monolithically formed on the substrate 200, they may be fabricated separately and then connected in series to each other.

Figure 3:
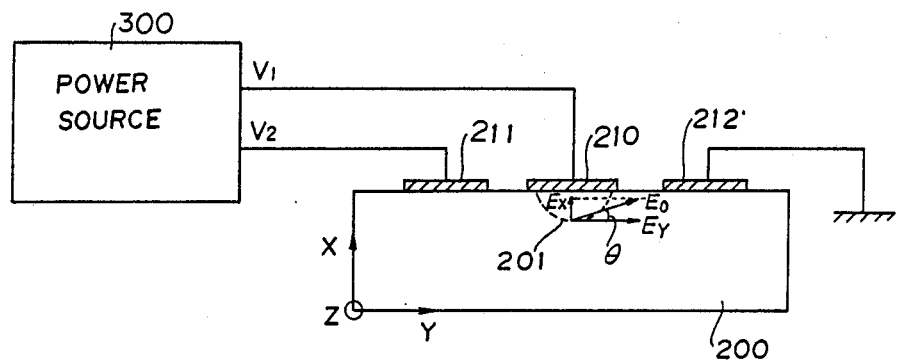
FIG. 3 is a cross sectional view showing a device in the first embodiment which is operated as a waveplate.

In FIG. 3, there is shown a polarization controller as described in the first embodiment which operates as a waveplate wherein like parts are indicated by like reference numerals except that voltages V1 and V2 are applied from a power source 300 to electrodes 210 and 211, while electrode 212 is connected to the ground. Although the following explanations are applied to the first device 220 of the polarization controller, these may be also applied to the second device 230 thereof. When the voltage V1 and V2 are applied to the electrodes 210 and 211 respectively, electric fields Ex and Ey are produced in the waveguide 201 as illustrated therein. The electric field Ex is dominantly determined by the voltage V1, and the electric field Ey is dominantly determined by the voltage V2. This means that the electric fields Ex and Ey are set to predetermined levels by adjusting the voltages V1 and V2. The electric fields Ex and Ey are approximately defined in the equations (1).

$$\left. \begin{array}{l} Ex = V_1 / W_1 \\ Ey = V_2 / W_2 \end{array} \right\} \quad (1)$$

where W1 is a gap between the electrodes 210 and 211 and between the electrodes 210 and 212, and W2 is a distance between the electrodes 211 and 212. As clearly understood from the illustration of the electric field Ex and Ey, a combined electric fields E0 is defined in the following equations (2).

$$Ex = E_0 \sin\theta \\ Ey = E_0 \cos\theta \quad (2)$$

where $\theta$ is an angle of the combined electric field E: which is rotated in an anti-clockwise direction in regard to a reference line of the electric field Ey. A refractive index is changed in the waveguide 201 dependent on the combined electric field E0. The change of the refractive index is defined in the equations (3) in accordance with a refractive index ellipsoid which is formed on an X-Y plane orthogonal to the Z axis of light propagating direction in the waveguide 201.

$$n_1 = n_0 + n_0^3 r_{22} E_0/2 \\ n_2 = n_0 - n_0^3 r_{22} E_0/2 \\ \phi = \theta/2 \quad (3)$$

where n1 and n2 are dimensions of a major and minor axes of the ellipsoid, n0 is the ordinary refractive index of the substrate 200, $\phi$ is an inclination angle of the minor and major axes, and r22 is a coefficient of an electrooptic effect of the substrate 200.

When the electric field E0 which is determined in the equations (2) is rotated, the principal axis of a birefringence is rotated in a predetermined direction. When a retardation is set to be $\pi$ or $\pi/2$ by adjusting the electric field E0, the first and second devices 220 and 230 are operated as a half-wave plate or a quarter-wave plate. The electric fields E0 which are required to provide a half-wave plate and a quarter-wave plate are defined in the equations (4) and (5) respectively.

$$E_0 = \frac{\lambda}{2n_0^3 r_{22} l} \quad (4)$$

$$E_0 = \frac{\lambda}{4n_0^3 r_{22} l} \quad (5)$$

where l is a length of the electrodes 210 and 211, and $\lambda$ is a wavelength of light which propagates through the waveguide 201.

The voltages V1 and V2 applied to the electrodes 210 and 211 are obtained from the equations (1) and (2) as defined in the equation (6).

$$V_1 = W_1 E_0 \sin\theta \\ V_2 = W_2 E_0 \cos\theta \quad (6)$$

In a case where the gap W1 is 4 μm, the distance W2 is 16 μm, the length l is 10 mm, and the wavelength $\lambda$ is 1.55 μm, the maximum values of the voltages V1 and V2 required for a half-wave plate operation are calculated to be 8.4 V and 33.6 V respectively. As calculated from the equations (4) and (5), the voltages V1 and V2 which are required for a quarter-wave plate operation are half values of those which are required for a half-wave plate operation.

In an actual operation, anisotropy is induced in the waveguide 201 to a small extent due to the structural dispersion. For this reason, a predetermined level of a biased voltage is desired to be added to the voltage V2 to compensate the anisotropy.

Figure 4:
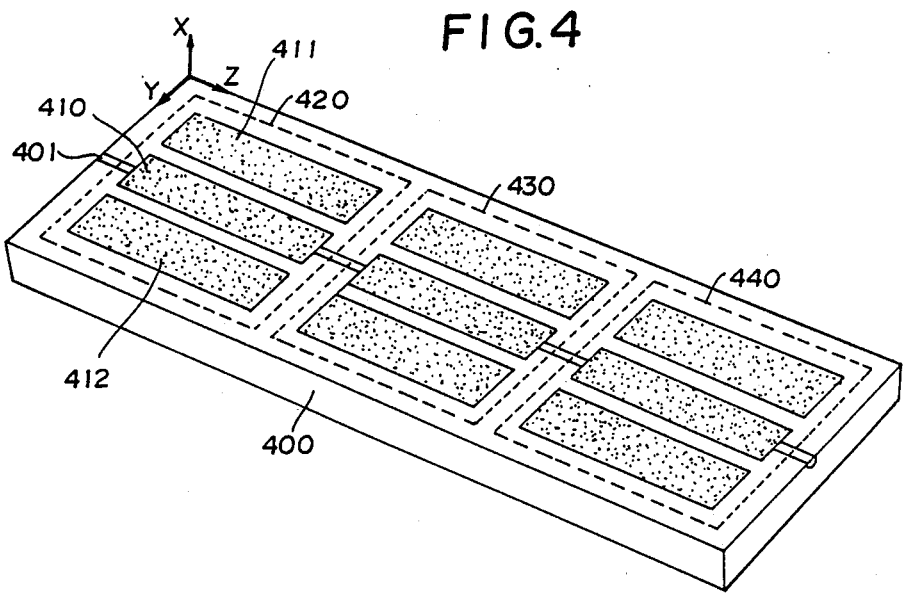
FIG. 4 is a perspective view showing a polarization controller in a second embodiment according to the invention.

In FIG. 4, there is shown a polarization controller in a second embodiment according to the invention. The polarization controller comprises a first, second and third devices 420, 430 and 440 provided in series on a substrate 400. The first device 420 comprises a waveguide 401, and electrodes 410, 411 and 412 provided on the waveguide 401 and on both sides thereof. The second and third devices 430 and 440 are of the same structure as that of the first device 420. The first and second devices 420 and 430 correspond to the first and second devices 220 and 230 of the polarization controller in the first embodiment, and the third device 440 operates as a quarter-wave plate.

In operation, an input light of an arbitrary polarization which is incident to the first device 420 is converted therein to a light of a linear polarization which is then converted in the second device 430 to a light of an arbitrary linear polarization. The light of an arbitrary linear polarization is then converted in the third device 440 to a light of an arbitrary polarization which is supplied therefrom to a next stage as an output light. As a matter of course, there is no limitation in an operating range in which a polarization of a light can be controlled even in the polarization controller in the second embodiment.

Figure 5:
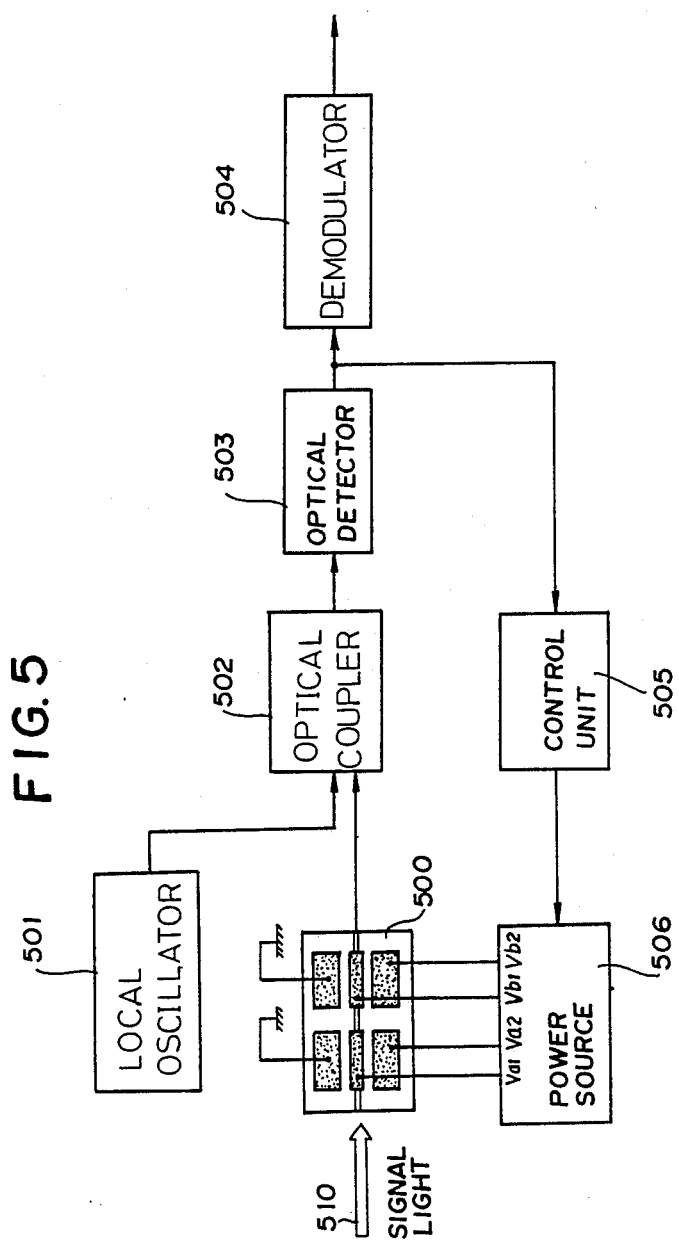
FIG. 5 is a block diagram showing an optical heterodyne receiving circuit in which a polarization controller in the first embodiment is utilized.

In FIG. 5, there is shown an optical heterodyne receiving circuit in which a polarization controller in the first embodiment is utilized. The heterodyne receiving circuit comprises the polarization controller 500 to which a signal light 510 is supplied, a local oscillator 501 for producing a local light, an optical coupler 502 for combining an output light supplied from the polarization controller 500 and the local light, an optical detector 503 for producing an intermediate frequency signal, a demodulator 504 for producing a data signal, a control unit 505 for producing a control signal in accordance with an intensity of the intermediate frequency signal, and a power source 506 for applying predetermined voltages Va1, Va2, Vb1 and Vb, to the first and second devices of the polarization controller 500 in accordance with the control signal supplied from the control unit 505.

In operation, the signal light 510 of an arbitrary polarization which is incident to the polarization controller 500 is converted therein to an output light of a horizontal linear polarization. The output light is combined in the optical coupler 502 with the local light of a horizontal linear polarization supplied from the local oscillator 501. The output light of the polarization controller 500 and the local light of the local oscillator 501 are of the same linear polarization so that the degradation of a receiver sensitivity is avoided by use of the polarization controller. The combined light of the optical coupler 502 is detected in the optical detector 503 to produce the intermediate frequency signal which is then demodulated in the demodulator 504. The demodulated signal is processed in following stages (not shown). On the other hand, an intensity of the intermediate frequency signal is monitored in the control unit 505 which produces a control signal dependent on the intensity thereby controlling the power source 506 to adjust the voltages Va1, Va2, Vb1 and Vb2 so that the intensity of the intermediate frequency signal is maximized. When a polarization of the output light of the polarization controller 500 coincides completely with that of the local light, the maximum intensity of the intermediate frequency signal is obtained.

A manner in which the polarization controller 500 is controlled will be explained in more detail. As described in the first embodiment, the polarization controller 500 is composed of the first device for a quarter-wave plate to which the signal light 510 is supplied and the second device for a half-wave plate from which the output light is supplied to the optical coupler 502. The voltages Va1 and Va2 applied to the first device and those Vb1 and Vb2 applied to the second device are expressed in the equations (7) and (8) in accordance with the equations (6).

$$Va_1 = Va_0 \sin\theta \\ Va_2 = Va_0 \cos\theta \quad (7)$$

$$Vb_1 = Vb_0 \sin\theta \\ Vb_2 = Vb_0 \cos\theta \quad (8)$$

where Va0 and Vb0 are constant values determined by the definitions of the aforementioned "W1E0" and "W2E0".

By applying the voltages expressed in the equations (7) and (8) to the first and second devices, the directions of birefringence are rotated in predetermined directions in the first and second devices. As a result, when the signal light of a specified polarization is incident to the polarization controller 500, the directions of the birefringence which are directly determined by the rotation angles $\theta a$ and $\theta b$ in the first and second devices are controlled to be appropriate directions so that the output light of a horizontal polarization is obtained. The rotation angles $\theta a$ and $\theta b$ are alternately controlled to be optimized by maximizing a horizontal polarization component of the output light so that the rotation angles $\theta a$ and $\theta b$ are gradually approaching the optimized angles by repeating the alternate controls. Even if a polarization of the signal light is fluctuated, the above described optimization of the rotation angles $\theta a$ and $\theta b$ is repeated so that a polarization control can be successively performed in the polarization controller 500.

The polarization controller 500 may be positioned between the local oscillator 501 and the optical coupler 502 so that a polarization of the local light is converted to coincide with that of the signal light 510. In such a case, the local light is incident to the second device for a half-wave plate, although the controlling procedure is the same as the above described one in which an intensity of the intermediate frequency signal is maximized.

Although the waveguide is grown by the diffusion of Ti into the substrate of LiNbO3, this may be provided by the ion exchange process. Further, this may be of a ridge type or a rib type. Still further, the diffusion of MgO may be performed over the whole substrate after the diffusion of Ti into the substrate to provide the waveguide. This results in the decrease of a biased voltage for compensating anisotropy in the waveguide because the waveguide becomes more isotropic.

Although LiNbO3 is used for the substrate, an electrooptic crystal with a three-fold axis, an electrooptic ceramic such as PLZT etc. may be adopted for the substrate. In a case where an electrooptic crystal with a three-fold axis is used, a light propagating direction is along an optical axis.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:
1. A polarization controller comprising,
   an optical channel waveguide provided on an electrooptic substrate,
   plural electrode groups provided in series in a light propagating direction on said electrooptic substrate, each of said plural electrode groups including a first electrode positioned on said optical channel waveguide, and second and third electrodes positioned on both sides of said optical channel waveguide, and means for applying predetermined voltages to said first to third electrodes in said each of said plural electrode groups,
   wherein said predetermined voltages are applied to said first to third electrodes so that an electric field is produced in a predetermined direction on a plane orthogonal to said light propagating direction, thereby producing a birefringence in said optical channel waveguide in accordance with an electrooptic effect of said electrooptic substrate.

2. A polarization controller according to claim wherein said plural electrode groups include first and second electrode groups,
   whereby retardations of $\pi/2$ and $\pi$ radians are induced in said first and second electrode groups in accordance with said birefringence in said optical channel waveguide, respectively.

3. A polarization controller according to claim 1,
   wherein said plural electrode groups include first to third electrode groups,
   whereby retardations of $\pi/2$, $\pi$ and $\pi/2$ radians are induced in said first to third electrode groups in accordance with said birefringence in said optical channel waveguide, respectively.

* * * * *